United States Patent
Hara et al.

(10) Patent No.: US 12,459,378 B2
(45) Date of Patent: Nov. 4, 2025

(54) COIL DEVICE, AND CONTACTLESS POWER SUPPLY SYSTEM

(71) Applicant: IHI Corporation, Tokyo (JP)

(72) Inventors: Masakazu Hara, Tokyo (JP); Susumu Tokura, Tokyo (JP)

(73) Assignee: IHI CORPORATION, Tokyo (JP)

(*) Notice: Subject to any disclaimer, the term of this patent is extended or adjusted under 35 U.S.C. 154(b) by 230 days.

(21) Appl. No.: 18/029,182

(22) PCT Filed: Dec. 21, 2020

(86) PCT No.: PCT/JP2020/047663
§ 371 (c)(1),
(2) Date: Mar. 29, 2023

(87) PCT Pub. No.: WO2022/137280
PCT Pub. Date: Jun. 30, 2022

(65) Prior Publication Data
US 2023/0365004 A1  Nov. 16, 2023

(51) Int. Cl.
*B60L 53/12* (2019.01)
*H02J 50/12* (2016.01)
*H02J 50/40* (2016.01)

(52) U.S. Cl.
CPC .............. *B60L 53/12* (2019.02); *H02J 50/12* (2016.02); *H02J 50/40* (2016.02); *B60L 2200/32* (2013.01)

(58) Field of Classification Search
CPC ...... B60L 53/12; B60L 2200/32; H02J 50/12; H02J 50/40; H02J 50/27; H02J 50/402; H02J 2310/42; H02J 50/005
See application file for complete search history.

(56) References Cited

U.S. PATENT DOCUMENTS

| | | | |
|---|---|---|---|
| 10,938,251 B1* | 3/2021 | Mehrabi | H02J 50/90 |
| 2009/0230777 A1* | 9/2009 | Baarman | H04B 5/77 |
| | | | 307/104 |
| 2013/0270925 A1* | 10/2013 | Tanaka | B60L 53/122 |
| | | | 307/104 |

(Continued)

FOREIGN PATENT DOCUMENTS

| | | |
|---|---|---|
| JP | 2002-305121 A | 10/2002 |
| JP | 2012-135108 A | 7/2012 |

(Continued)

OTHER PUBLICATIONS

Japanese Office Action, Japanese Patent Application No. 2019-153555, Jan. 31, 2023, 4 pgs.

*Primary Examiner* — Rexford N Barnie
*Assistant Examiner* — Michael J Warmflash
(74) *Attorney, Agent, or Firm* — Volpe Koenig

(57) ABSTRACT

A power-receiving coil device is installed inside an exposed part housing. The power-receiving coil device includes a power-receiving-side coil part that receives power from a power-transmitting-side coil part of a power-transmitting coil device, and a power-receiving-side core magnetic body. The power-receiving-side coil part has a first power-receiving coil and a second power-receiving coil which are arranged along a direction of a coil axis. An outer width of the first power-receiving coil is smaller than an outer width of the second power-receiving coil when viewed along a front-back direction perpendicular to the coil axis.

5 Claims, 10 Drawing Sheets

(56) References Cited

U.S. PATENT DOCUMENTS

| | | | |
|---|---|---|---|
| 2014/0232200 A1* | 8/2014 | Maekawa | H02J 50/005 |
| | | | 307/104 |
| 2014/0368167 A1* | 12/2014 | Okura | H02M 3/33507 |
| | | | 363/21.01 |
| 2016/0294225 A1* | 10/2016 | Blum | H02J 7/342 |
| 2017/0077759 A1* | 3/2017 | Niizuma | B60L 5/005 |
| 2017/0127196 A1* | 5/2017 | Blum | H04R 25/554 |
| 2017/0331316 A1* | 11/2017 | Bushnell | H02J 50/10 |
| 2019/0305602 A1 | 10/2019 | Niizuma | |
| 2020/0094700 A1* | 3/2020 | Hui | B60L 53/60 |
| 2020/0169117 A1* | 5/2020 | Okamoto | H02J 50/005 |
| 2021/0273490 A1 | 9/2021 | Okamoto et al. | |
| 2021/0384754 A1* | 12/2021 | Xu | H01F 7/02 |
| 2021/0398733 A1* | 12/2021 | Moussaoui | H01F 3/10 |
| 2021/0399577 A1* | 12/2021 | Qiu | H01F 38/14 |
| 2023/0059432 A1* | 2/2023 | Shi | H02J 50/80 |

FOREIGN PATENT DOCUMENTS

| | | |
|---|---|---|
| JP | 2013-090353 A | 5/2013 |
| JP | 2014-230441 A | 12/2014 |
| JP | 2014-239175 A | 12/2014 |
| JP | 2015-015901 A | 1/2015 |
| JP | 2015-231307 A | 12/2015 |
| JP | 2018-191474 A | 11/2018 |
| JP | 2019-004628 A | 1/2019 |
| JP | 2021-034579 A | 3/2021 |
| WO | 2015/121977 A1 | 8/2015 |

* cited by examiner

COIL DEVICE, AND CONTACTLESS POWER SUPPLY SYSTEM

TECHNICAL FIELD

The present disclosure relates to a coil device and a wireless power supply system.

BACKGROUND ART

For example, Patent Literature 1 discloses a wireless power supply system that wirelessly supplies electric power between a power receiving device mounted in an underwater vehicle that travels under water and an externally installed power transmitting device. In such a wireless power supply system, power is transmitted and received using a coil part provided in the power receiving device and a coil part provided in the power transmitting device.

CITATION LIST

Patent Literature

Patent Literature 1: Japanese Unexamined Patent Publication No. 2015-231307

SUMMARY OF INVENTION

Technical Problem

Such a wireless power supply system may be restricted by the shape of the housing that contains the coil part when disposing the coil part. Being restricted by the housing when disposing the coil part may reduce power supply efficiency between the coil parts. There is thus a need in this technical field to prevent being restricted by the shape of the housing when disposing the coil part, and improve the power supply efficiency.

Solution to Problem

A coil device according to one aspect of the present disclosure is installed inside a housing and is configured to transmit or receive power to or from a counterpart coil device installed outside the housing, the coil device including a coil part having a conductive wire wound around a core space extending along a coil axis, the coil part being configured to transmit or receive power to or from a counterpart coil part of the counterpart coil device, and a core magnetic body disposed inside the core space, wherein the coil axis extends along a direction in which the coil part and the counterpart coil part face one another when power is being transmitted or received, wherein the coil part has a first coil portion and a second coil portion arranged along a direction of the coil axis, and wherein, when viewed along a predetermined reference direction perpendicular to the coil axis, an outer width of the first coil portion in a width direction perpendicular to the direction of the coil axis and the reference direction is smaller than an outer width of the second coil portion in the width direction.

Effects of Invention

One aspect of the present disclosure is capable of preventing being restricted by the shape of the housing when disposing the coil part, and improving power supply efficiency.

DESCRIPTION OF EMBODIMENTS

Figure 1:
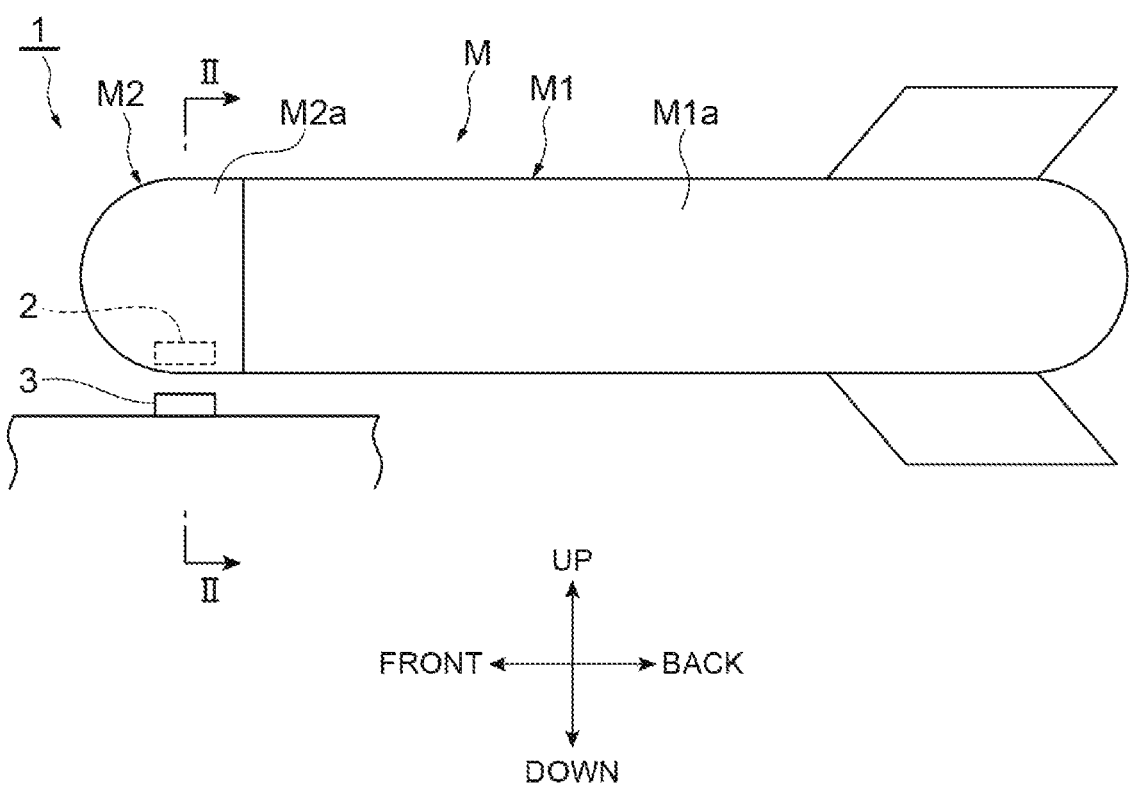
FIG. 1 is a schematic view of a wireless power supply system according to a first embodiment viewed from a lateral side of an underwater vehicle.

A coil device according to one aspect of the present disclosure is installed inside a housing and is configured to transmit or receive power to or from a counterpart coil device installed outside the housing, the coil device including a coil part having a conductive wire wound around a core space extending along a coil axis, the coil part being configured to transmit or receive power to or from a counterpart coil part of the counterpart coil device, and a core magnetic body disposed inside the core space, wherein the coil axis extends along a direction in which the coil part and the counterpart coil part face one another when power is being transmitted or received, wherein the coil part has a first coil portion and a second coil portion arranged along a direction of the coil axis, and wherein, when viewed along a predetermined reference direction perpendicular to the coil axis, an outer width of the first coil portion in a width direction perpendicular to the direction of the coil axis and the reference direction is smaller than an outer width of the second coil portion in the width direction.

In this coil device, the outer widths of the first coil portion and the second coil portion are different when viewed along the reference direction. Thus, even if the housing is shaped to have different widths at different positions in the direction of the coil axis, the coil device enables the coil part to be disposed inside the housing along the shape of the housing which has a varying width. That is, the coil device makes it possible to dispose the coil part which has a larger shape in the direction of the coil axis, and increase a magnetic flux that interlinks with the coil part when transmitting or receiving power. The coil device is also capable of further increasing the magnetic flux through the coil part when transmitting or receiving power due to the core magnetic body disposed inside the coil part. The coil part is thus capable of preventing being restricted by the shape of the housing when disposing the coil part, and improving the power supply efficiency.

The first coil portion may be positioned more toward the counterpart coil part than the second coil portion in a state in which power is transmitted or received. In this case, even if the housing is shaped to have a width that gradually decreases toward the counterpart coil part, the coil device enables the coil part to be disposed inside the housing in a position closer to the counterpart coil part. Thus, the interval between the coil part and the counterpart coil part is reduced, so that a stronger coupling of the magnetic flux is formed between the coil part and the counterpart coil part due to external leakage of the magnetic flux being suppressed. Consequently, the coil device is capable of further improving the power supply efficiency.

In the coil device, the coil part may have a first coil including the first coil portion, and a second coil including the second coil portion, and the first coil and the second coil may be arranged along the direction of the coil axis. In this case, the coil part can be easily formed by arranging the first coil and the second coil, which have different outer widths.

In the coil device, an end of the core magnetic body facing the counterpart coil part may project out of the coil part from a surface of the coil part facing the counterpart coil part. In this case, the core magnetic body is capable of more appropriately inducing the magnetic flux from the counterpart coil part toward the coil part, and further increasing the magnetic flux through the coil part. Alternatively, the core magnetic body is capable of more efficiently inducing the magnetic flux from the coil part toward the counterpart coil part. The coil device is thus capable of further improving the power supply efficiency.

The coil device may further include a base magnetic body disposed to face a surface of the coil part opposite a surface facing the counterpart coil part, and a coupling magnetic body having one end coupled to the base magnetic body, wherein the coupling magnetic body may extend through the outside of the coil part toward a counterpart base magnetic body provided in the counterpart coil device such that another end of the coupling magnetic body faces the counterpart base magnetic body in the state in which power is transmitted or received. In this case, the coil device is capable of inducing, by the coupling magnetic body, the magnetic flux from the base magnetic body toward the counterpart base magnetic body through the outside of the coil part, or the magnetic flux from the counterpart base magnetic body toward the base magnetic body through the outside of the coil part. The coil device is thus capable of appropriately inducing the magnetic flux passing through the outside the coil part, and further improving the power supply efficiency.

The other end of the coupling magnetic body may project out of the housing. In this case, the coil device is capable of inducing the magnetic flux even on an outer portion of the housing by the coupling magnetic body. The coil device is thus capable of further improving the power supply efficiency.

The coil device may further include a drive part configured to change a position of the other end of the coupling magnetic body by swinging the coupling magnetic body. In this case, the coil device is capable of changing the position of the end of the coupling magnetic body to match the shape or the like of the counterpart base magnetic body. Thus, by swinging the coupling magnetic body to match the shape or the like of the counterpart base magnetic body, the coil device enables power to be efficiently supplied between the coil device and a plurality of types of the counterpart coil devices each having a counterpart base magnetic body with a different shape or the like.

The coil device may be mounted in a movable object, and the coupling magnetic body may be formed of a structure provided in the movable object and made of a magnetic material. In this case, the coil device is capable of advantageously using the structure provided in the movable object and made of a magnetic material as the coupling magnetic body.

A wireless power supply system according to another aspect of the present disclosure is configured to supply power between a first coil device installed inside a housing of a movable object and a second coil device installed outside the movable object, wherein the first coil device includes a first coil part having a conductive wire wound around a core space extending along a coil axis, the first coil part being configured to transmit or receive power to or from the second coil device, and a core magnetic body disposed inside the core space, wherein the second coil device includes a second coil part configured to transmit or receive power to or from the first coil part, wherein the coil axis extends along a direction in which the first coil part and the second coil part face one another when power is being transmitted or received, wherein the first coil part has a first coil portion and a second coil portion arranged along a direction of the coil axis, and wherein, when viewed along a predetermined reference direction perpendicular to the coil axis, an outer width of the first coil portion in a width direction perpendicular to the direction of the coil axis and the reference direction is smaller than an outer width of the second coil portion in the width direction.

In the first coil device of this wireless power supply system, the outer widths of the first coil portion and the second coil portion are different when viewed along the reference direction. Thus, even if the housing is shaped to have different widths at different positions in the direction of the coil axis, the first coil device enables the first coil part to be disposed inside the housing along the shape of the housing which has a varying width. That is, the first coil device makes it possible to dispose the first coil part which has a larger shape in the direction of the coil axis, and increase the magnetic flux that interlinks with the first coil part when transmitting or receiving power. The first coil device is also capable of further increasing the magnetic flux through the first coil part when transmitting or receiving power due to the core magnetic body disposed inside the first coil part. The wireless power supply system is thus capable of preventing being restricted by the shape of the housing when disposing the first coil part, and improving the power supply efficiency.

Embodiments of the present disclosure will be described below with reference to the drawings. Like reference signs will be given to like or corresponding elements in the description below, and redundant explanation will be omitted.

First Embodiment

Figure 2:
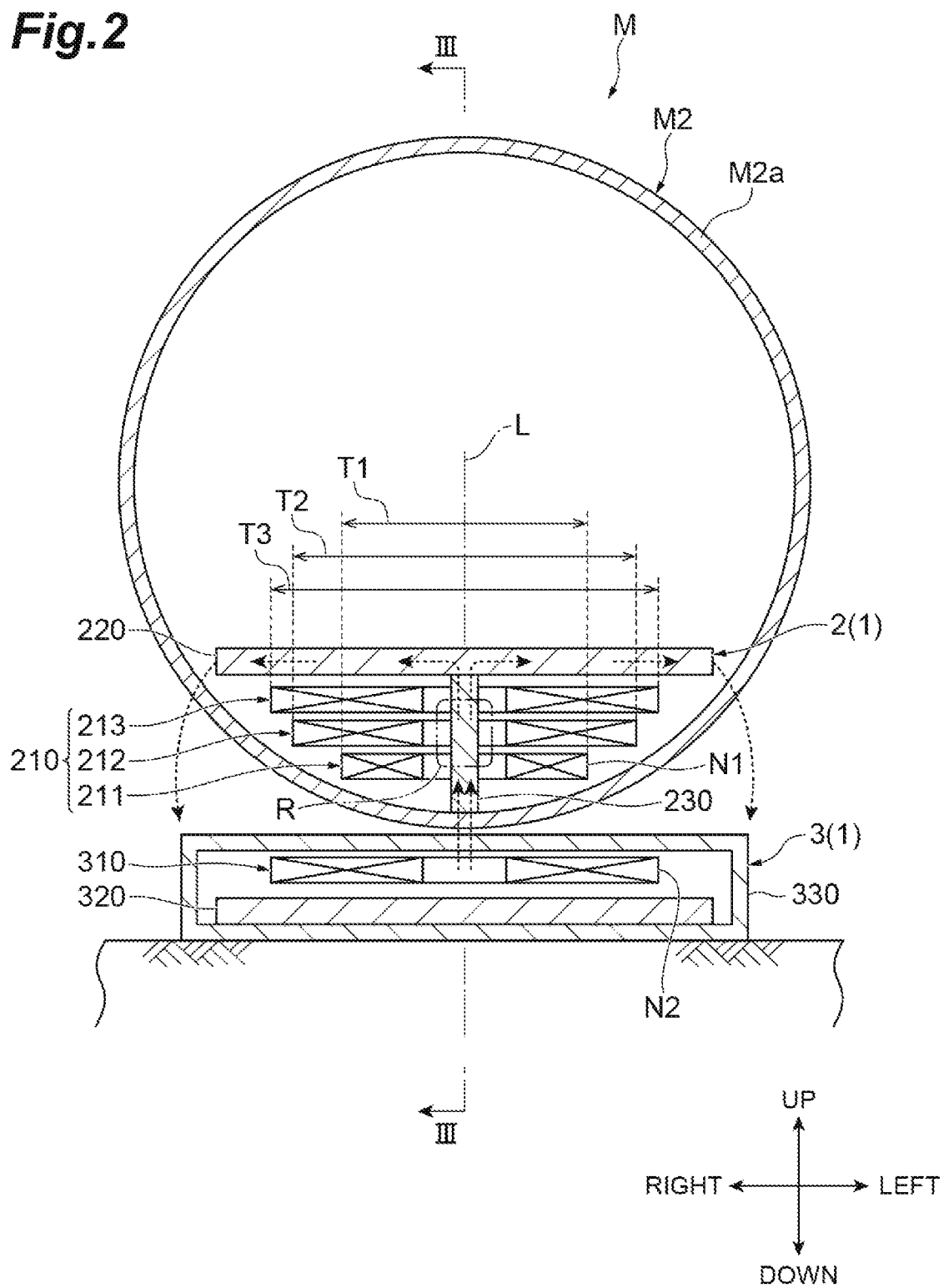
FIG. 2 is a cross-sectional view taken along line II-II of FIG. 1.
Figure 3:
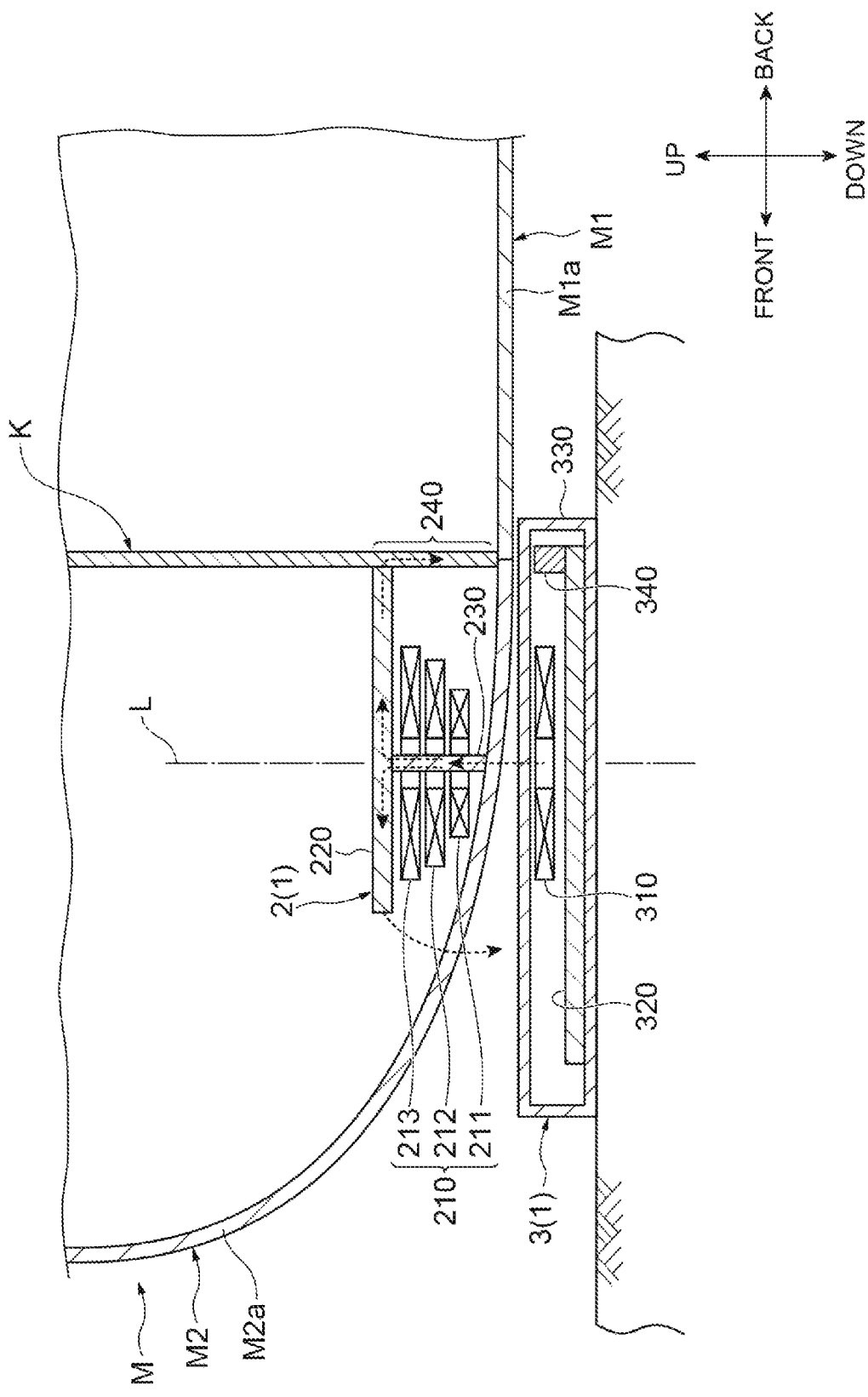
FIG. 3 is a cross-sectional view taken along line of FIG. 2.

A first embodiment will be described. The first embodiment is a coil device according to the present disclosure applied to a power-receiving coil device of a wireless power supply system. As illustrated in FIGS. 1 to 3, a wireless power supply system 1 according to this embodiment includes a power-receiving coil device (coil device, first coil device) 2 mounted in an underwater vehicle (movable object) M that travels under water (under the sea), and a power-transmitting coil device (counterpart coil device, second coil device) 3 that is installed in a power supply location provided under water. A battery is connected to the power-receiving coil device 2 via a power-receiving circuit, a charging circuit, and the like. An external power source is connected to the power-transmitting coil device 3 via a power-transmitting circuit, a rectifier circuit, and the like. In the description below, "front," "back," "left," and "right" are directions with respect to the underwater vehicle M. "Up" and "down" refer to up and down in a vertical direction. An up-down direction is perpendicular to a front-back direction. A left-right direction is perpendicular to the up-down direction and the front-back direction.

The underwater vehicle M includes a body part M1 and an exposed part M2 which is coupled to a front end of the body part M1. The body part M1 is provided with a drive source (electric motor) or the like for sailing under water. The power-receiving coil device 2 is installed in a lower part inside an exposed part housing (housing) M2a of the exposed part M2.

The power-receiving coil device 2 is positioned above the power-transmitting coil device 3 when the underwater vehicle M arrives at the power supply location. That is, the power-receiving coil device 2 and the power-transmitting coil device 3 face each other in the up-down direction. Coils provided inside the power-receiving coil device 2 and the power-transmitting coil device 3 are electromagnetically coupled to form an electromagnetic coupling circuit, so that power is wirelessly supplied from the coil of the power-transmitting coil device 3 to the coil of the power-receiving coil device 2. That is, the power-receiving coil device 2 wirelessly receives electric power from the power-transmitting coil device 3. The electromagnetic coupling circuit may be a circuit that supplies power by "electromagnetic induction" or a circuit that supplies power by "magnetic resonance."

The exposed part housing M2a is formed of a material other than metal such as resin (as one example, a nonmagnetic material) so that power can be wirelessly supplied between the power-receiving coil device 2 and the power-transmitting coil device 3 installed outside the exposed part housing M2a. In this embodiment, the exposed part housing M2a has an annular cross-section when viewed along the front-back direction as illustrated in FIG. 2. Additionally, the front surface of the exposed part housing M2a is hemispherical. The exposed part housing M2a serves as a housing that contains the power-receiving coil device 2.

When wirelessly supplying power between the power-receiving coil device 2 and the power-transmitting coil device 3, it is desired that the coupling coefficient between the coils of the power-receiving coil device 2 and the power-transmitting coil device 3 (magnetic flux coupling coefficient) is increased to improve power supply efficiency. The configuration of the wireless power supply system 1 will be described below which is capable of preventing being restricted by the shape of the housing when disposing the coil part, and increasing the coupling coefficient between the coils to improve the power supply efficiency.

As illustrated in FIGS. 2 and 3, the power-receiving coil device 2 includes a power-receiving-side coil part (coil part, first coil part) 210, a power-receiving-side base magnetic body (base magnetic body) 220, and a power-receiving-side core magnetic body (core magnetic body) 230. The power-receiving-side coil part 210 has a conductive wire wound around a core space R that extends along a coil axis L. The power-receiving-side coil part 210 wirelessly receives power from a power-transmitting-side coil part (second coil part, counterpart coil part) 310 of the power-transmitting coil device 3. The coil axis L extends in the up-down direction. That is, the coil axis L extends along a direction in which the power-receiving coil device 2 and the power-transmitting coil device 3 face one another when power is being received (transmitted).

More specifically, the power-receiving-side coil part 210 includes a first power-receiving coil (first coil, first coil portion) 211, a second power-receiving coil (second coil, second coil portion) 212, and a third power-receiving coil 213. Each of the first power-receiving coil 211 to the third power-receiving coil 213 is formed in a substantially flat plate-like shape extending in a horizontal direction. The first power-receiving coil 211, the second power-receiving coil 212, and the third power-receiving coil 213 are arranged in this order from the bottom to the top. The first power-receiving coil 211 is positioned more toward the power-transmitting coil device 3 than the second power-receiving coil 212 in a state in which power is received from the power-transmitting coil device 3. The second power-receiving coil 212 is positioned more toward the power-transmitting coil device 3 than the third power-receiving coil 213 in the state in which power is received from the power-transmitting coil device 3.

The power-receiving-side coil part 210 is thus formed of the first power-receiving coil 211 to the third power-receiving coil 213 which are arranged along a direction of the coil axis L. The first power-receiving coil 211 to the third power-receiving coil 213 are connected in series with each other, for example, in the order of the first power-receiving coil 211, the second power-receiving coil 212, and the third power-receiving coil 213.

The first power-receiving coil 211 has a conductive wire N1 (see FIG. 2) wound around the core space R that extends along the coil axis L. The first power-receiving coil 211 thus has a hole (core space R) that extends along the up-down direction (direction of the coil axis L). When viewed from above, the first power-receiving coil 211 has a substantially circular outer edge shape. However, the shape of the outer edge of the first power-receiving coil 211 is not limited, and may, for example, be substantially elliptic. A litz wire in which a plurality of conductor strands insulated from each other are twisted together is, for example, used as the conductive wire N1 that forms the first power-receiving coil 211. However, a copper or aluminum solid wire may also be used as the conductive wire N1 that forms the first power-receiving coil 211.

The configurations of the second power-receiving coil 212 and the third power-receiving coil 213 are the same as the configuration of the first power-receiving coil 211. Similarly to the first power-receiving coil 211, each of the second power-receiving coil 212 and the third power-receiving coil 213 has a hole (core space R) that extends along the up-down direction (direction of the coil axis L). The first power-receiving coil 211 to the third power-receiving coil 213 are arranged along the direction of the coil axis L such that the holes provided therein communicate along the direction of the coil axis L.

As illustrated in FIG. 2, an outer width T1 of the first power-receiving coil 211 in the left-right direction (width direction) is smaller than an outer width T2 of the second power-receiving coil 212 in the left-right direction when viewed along the front-back direction (reference direction) perpendicular to the coil axis L. Similarly, the outer width T2 of the second power-receiving coil 212 in the left-right direction (width direction) is smaller than an outer width T3 of the third power-receiving coil 213 in the left-right direction. The power-receiving-side coil part 210 thus has an outer width that gradually decreases toward the bottom when viewed along the front-back direction.

In the present embodiment, each of the first power-receiving coil 211 to the third power-receiving coil 213 has a substantially circular outer edge shape when viewed from above. The power-receiving-side coil part 210 thus has an outer shape that gradually decreases toward the bottom when viewed along any direction perpendicular to the coil axis L. For example, the power-receiving-side coil part 210 has an outer width that gradually decreases toward the bottom when the power-receiving-side coil part 210 is viewed along the left-right direction as illustrated in FIG. 3.

The exposed part housing M2a has an annular cross-section when viewed along the front-back direction as described above. That is, a width in the left-right direction of the lower part of the exposed part housing M2a gradually decreases toward the bottom. That is, the exposed part housing M2a has different widths at different positions in the direction of the coil axis L when viewed along the front-back direction. Thus, the power-receiving-side coil part 210 which has an outer width that gradually decreases toward the bottom is contained in the lower part of the exposed part housing M2a which has a width that gradually decreases toward the bottom when viewed along the front-back direction.

That is, the width of a part of the exposed part housing M2a that encloses the first power-receiving coil 211 in the left-right direction (width in the left-right direction) is smaller than the width of a part of the exposed part housing M2a that encloses the second power-receiving coil 212 in the left-right direction (width in the left-right direction) when viewed along the front-back direction. The width of the part of the exposed part housing M2a that encloses the second power-receiving coil 212 in the left-right direction (width in the left-right direction) is smaller than the width of a part of the exposed part housing M2a that encloses the third power-receiving coil 213 in the left-right direction (width in the left-right direction) when viewed along the front-back direction.

The power-receiving-side coil part 210 thus has a shape that conforms to the shape of the space of the lower part inside the exposed part housing M2a that contains the power-receiving-side coil part 210 when viewed along the front-back direction.

The power-receiving-side base magnetic body 220 is a substantially plate-like member disposed inside the exposed part housing M2a so as to face an upper surface of the power-receiving-side coil part 210 (third power-receiving coil 213). The power-receiving-side base magnetic body 220 is made, for example, of ferrite. That is, the power-receiving-side base magnetic body 220 is disposed so as to face a surface of the power-receiving-side coil part 210 (upper surface of the power-receiving-side coil part 210) opposite the surface facing the power-transmitting coil device 3 (lower surface of the power-receiving-side coil part 210).

The power-receiving-side core magnetic body 230 is a substantially pillar-like member that extends along the direction of the coil axis L. The power-receiving-side core magnetic body 230 is disposed inside the hole (core space R) provided in the power-receiving-side coil part 210. The power-receiving-side core magnetic body 230 is made, for example, of ferrite. An upper end of the power-receiving-side core magnetic body 230 abuts a lower surface of the power-receiving-side base magnetic body 220. A lower end of the power-receiving-side core magnetic body 230 (end on a side facing the power-transmitting coil device 3) projects out of the power-receiving-side coil part 210 from the surface of the power-receiving-side coil part 210 facing the power-transmitting coil device 3 (lower surface of the first power-receiving coil 211). Additionally, the lower end of the power-receiving-side core magnetic body 230 may abut an inner surface of the exposed part housing M2a.

As illustrated in FIG. 3, the power-receiving coil device 2 further includes a coupling magnetic body 240. The underwater vehicle M includes a partition wall K that separates the body part M1 from the exposed part M2. The partition wall K is made of a magnetic material (for example, iron material or laminated steel). A body part housing M1a of the body part M1 is made of a nonmagnetic material. An outer edge of the partition wall K is connected to the body part housing M1a that contacts the water around the underwater vehicle M. The power-receiving coil device 2 uses a part of the partition wall K as the coupling magnetic body 240. The coupling magnetic body 240 is thus formed of a part of the partition wall K (structure) that is provided in the underwater vehicle M and made of a magnetic material. The power-receiving coil device 2 may also use a structure (for example, a frame) made of a magnetic material other than the partition wall K provided in the underwater vehicle M as the coupling magnetic body 240.

A back end of the power-receiving-side base magnetic body 220 abuts the coupling magnetic body 240. That is, an upper end (one end) of the coupling magnetic body 240 is coupled to the power-receiving-side base magnetic body 220.

The power-receiving coil device 2 is capable of forming, by the power-receiving-side core magnetic body 230, an appropriate magnetic circuit from a power-transmitting-side base magnetic body 320 of the power-transmitting coil device 3 toward the power-receiving-side base magnetic body 220 through the hole in the center of the power-receiving-side coil part 210. In FIGS. 2 and 3, the flow of the magnetic flux generated between the power-receiving coil device 2 and the power-transmitting coil device 3 is indicated by the dotted line arrows. The flow of the magnetic flux is also indicated by the dotted line arrows in the other drawings.

In the state in which power is received from the power-transmitting coil device 3, the coupling magnetic body 240 extends through a back side (outside) of the power-receiving-side coil part 210 toward the power-transmitting-side base magnetic body 320 such that a lower end (other end) of the coupling magnetic body 240 faces the power-transmitting-side base magnetic body 320 provided in the power-transmitting coil device 3. The power-receiving coil device 2 is capable of forming, by the coupling magnetic body 240, an appropriate magnetic circuit from the back side of the power-receiving-side base magnetic body 220 toward the power-transmitting-side base magnetic body 320 of the power-transmitting coil device 3.

As illustrated in FIGS. 2 and 3, the power-transmitting coil device 3 includes the power-transmitting-side coil part 310, the power-transmitting-side base magnetic body 320, and a power-transmitting-side housing 330. The power-transmitting-side coil part 310 has a conductive wire N2 (see FIG. 2) wound around the coil axis L. When viewed from above, the power-transmitting-side coil part 310 has a substantially circular outer edge shape. However, the outer edge shape of the power-transmitting-side coil part 310 is not limited, and may, for example, be substantially elliptic. A litz wire in which a plurality of conductor strands insulated from each other are twisted together is, for example, used as the conductive wire N2 that forms the power-transmitting-side coil part 310. However, a copper or aluminum solid wire may also be used as the conductive wire N2 that forms the power-transmitting-side coil part 310.

When wirelessly supplying power between the power-transmitting coil device 3 and the power-receiving coil device 2, the underwater vehicle M stops at the power supply location such that the coil axis L of the power-receiving-side coil part 210 of the power-receiving coil device 2 coincides with the coil axis L of the power-transmitting-side coil part 310 of the power-transmitting coil device 3.

The power-transmitting-side base magnetic body 320 is a substantially plate-like member disposed so as to face a lower surface of the power-transmitting-side coil part 310. The power-transmitting-side base magnetic body 320 is made, for example, of ferrite. The power-transmitting-side housing 330 contains the power-transmitting-side coil part 310 and the power-transmitting-side base magnetic body 320. The power-transmitting-side housing 330 is made, for example, of a nonmagnetic material.

As illustrated in FIG. 3, the power-transmitting coil device 3 may further include a rising part 340 that rises upward from the power-transmitting-side base magnetic body 320. The rising part 340 is provided in a position at which an upper end of the rising part 340 faces a lower end of the coupling magnetic body 240 of the power-receiving coil device 2 in a state in which power is transmitted to the power-receiving coil device 2. The rising part 340 may be formed by projecting an end of the power-transmitting-side base magnetic body 320 upward. That is, the rising part 340 may be a part of the power-transmitting-side base magnetic body 320. Additionally, the rising part 340 may be a member made of a magnetic material other than the power-transmitting-side base magnetic body 320.

As described above, in the power-receiving coil device 2 of the wireless power supply system 1, the first power-receiving coil 211 to the third power-receiving coil 213 have different outer widths when viewed along the front-back direction. Thus, even if the exposed part housing M2a is shaped to have different widths at different positions in the direction of the coil axis L, the power-receiving coil device 2 enables the power-receiving-side coil part 210 to be disposed inside the exposed part housing M2a along the shape of the exposed part housing M2a which has a varying width. That is, the power-receiving coil device 2 makes it possible to dispose the power-receiving-side coil part 210 which has a larger shape in the direction of the coil axis L, and increase the magnetic flux that interlinks with the power-receiving-side coil part 210 when receiving power. Additionally, the power-receiving coil device 2 is capable of further increasing the magnetic flux through the power-receiving-side coil part 210 when receiving power due to the power-receiving-side core magnetic body 230 disposed inside the power-receiving-side coil part 210. Consequently, the power-receiving coil device 2 is capable of preventing being restricted by the shape of the exposed part housing M2a when disposing the power-receiving-side coil part 210, and improving the power supply efficiency.

In general, the housing of the underwater vehicle M has a curved surface shape. Additionally, the distance between the coils during wireless power supply depends on the size of the coils (size in the direction perpendicular to the coil axis L). It is thus desired to use larger coils. Since coils generally have a flat plate-like shape, trying to dispose a larger coil on a bottom part of a curved housing will result in a side of the coil abutting a side wall of the housing, thereby preventing the coil from being disposed in a position closer to a bottom wall of the housing. That is, the interval between the flat plate-like coil and the bottom wall of the curving housing increases.

The power-receiving-side coil part 210 of the power-receiving coil device 2 thus has an outer width that gradually decreases toward the bottom. Consequently, even if the exposed part housing M2a is shaped so that a bottom part has a width that gradually decreases toward the bottom (toward the power-transmitting coil device 3) when viewed along the front-back direction, the power-receiving coil device 2 enables the power-receiving-side coil part 210 to be disposed inside the exposed part housing M2a in a position closer to the power-transmitting coil device 3. The interval between the power-receiving-side coil part 210 and the power-transmitting-side coil part 310 is accordingly reduced, so that a stronger coupling of the magnetic flux is formed between the power-receiving-side coil part 210 and the power-transmitting-side coil part 310 due to external leakage of the magnetic flux being suppressed. As a result, the power-receiving coil device 2 is capable of further improving the power supply efficiency.

The power-receiving-side coil part 210 is formed by arranging the first power-receiving coil 211 to the third power-receiving coil 213, which have different outer widths. In this case, the power-receiving-side coil part 210 having different outer widths at different positions in the direction of the coil axis L when viewed along the front-back direction can be easily formed.

The lower end of the power-receiving-side core magnetic body 230 projects below the lower surface of the power-receiving-side coil part 210. In this case, the power-receiving-side core magnetic body 230 is capable of more appropriately inducing the magnetic flux from the power-transmitting-side coil part 310 toward the power-receiving-side coil part 210, and further increasing the magnetic flux through the power-receiving-side coil part 210. As a result, the power-receiving coil device 2 is capable of further improving the power supply efficiency.

The power-receiving coil device 2 includes the coupling magnetic body 240 that extends from the power-receiving-side base magnetic body 220 toward the power-transmitting-side base magnetic body 320 of the power-transmitting coil device 3. In this case, the power-receiving coil device 2 is capable of inducing, by the coupling magnetic body 240, the magnetic flux from the power-receiving-side base magnetic body 220 toward the power-transmitting-side base magnetic body 320 through the outside of the power-receiving-side coil part 210. An appropriate magnetic circuit is thus formed between the power-receiving coil device 2 and the power-transmitting coil device 3, and the magnetic flux can efficiently interlink with the power-receiving-side coil part 210. As a result, induced electromotive force increases in the power-receiving coil device 2, so that the power supply efficiency can also be improved. Consequently, the power-receiving coil device 2 is capable of appropriately inducing the magnetic flux passing through the outside of the power-receiving-side coil part 210, and further improving the power supply efficiency.

The power-receiving coil device 2 of the first embodiment uses a part of the partition wall K, which is a structure of the underwater vehicle M, as the coupling magnetic body 240. This is not limiting, and the power-receiving coil device 2 may also use a member other than the structure of the underwater vehicle M as the coupling magnetic body 240. For example, the power-receiving coil device 2 may use, as the coupling magnetic body 240, a rising part that extends downward (toward the power-transmitting-side base magnetic body 320) from the back end of the power-receiving-side base magnetic body 220, similarly to the rising part 340 of the power-transmitting coil device 3. In this case, the rising part as the coupling magnetic body 240 may be formed by projecting the end of the power-receiving-side base magnetic body 220 downward, similarly to the rising part 340 of the power-transmitting coil device 3. That is, the rising part as the coupling magnetic body 240 may be a part of the power-receiving-side base magnetic body 220. Additionally, the rising part as the coupling magnetic body 240 may be a member made of a magnetic material other than the power-receiving-side base magnetic body 220.

Furthermore, although the power-receiving-side coil part 210 of the power-receiving coil device 2 of the first embodiment is formed of three coils (first power-receiving coil 211 to third power-receiving coil 213) having different outer widths, the number of the coils is not limited to three. It is only required that the power-receiving-side coil part 210 is formed of two or more coils having different outer widths.

Figure 4:
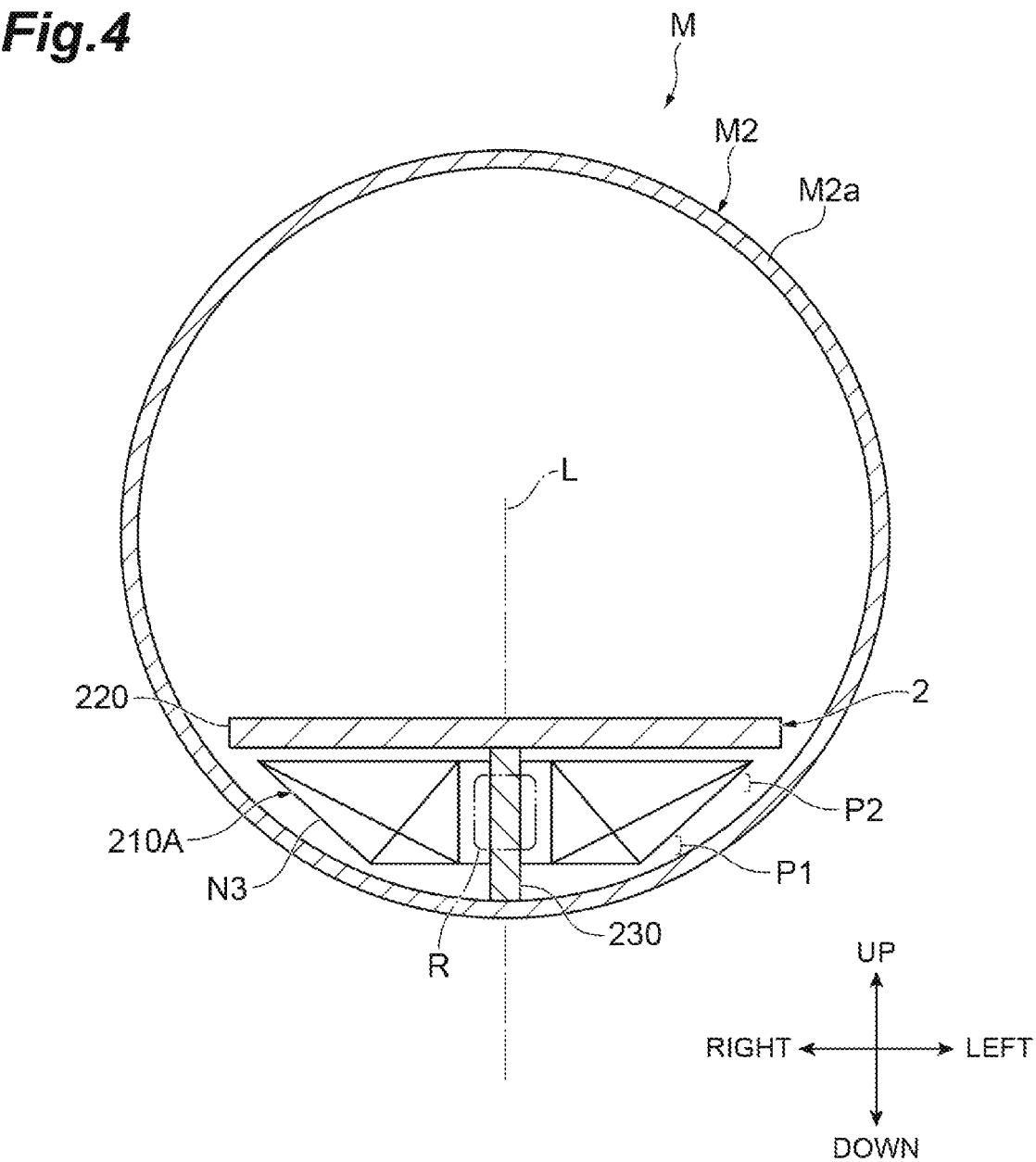
FIG. 4 is a cross-sectional view illustrating a schematic configuration of a power-receiving coil device having a power-receiving-side coil part according to a variation.
Figure 5:
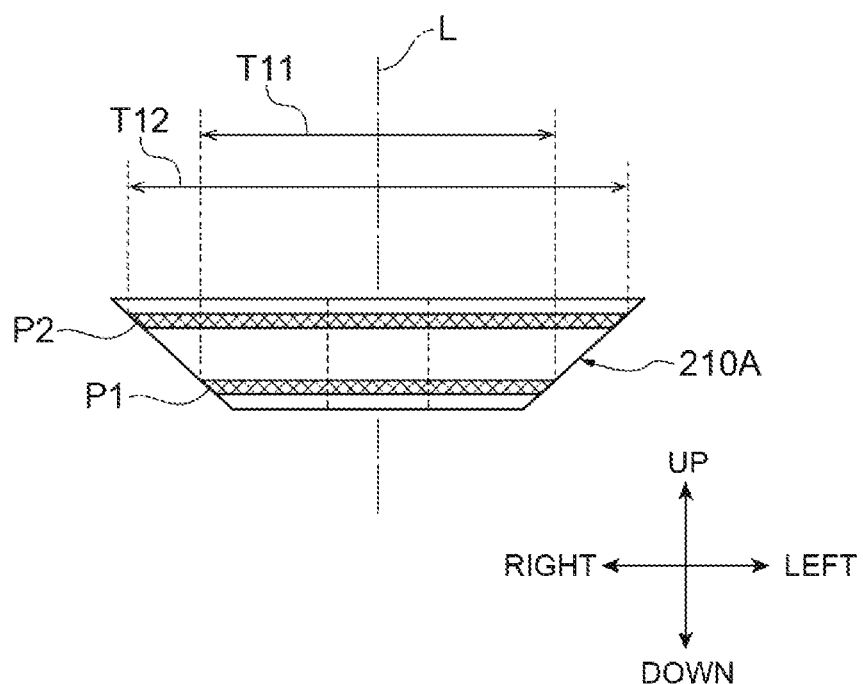
FIG. 5 is a side view illustrating the power-receiving-side coil part according to the variation.

Furthermore, the power-receiving-side coil part 210 is not limited to being formed by arranging two or more coils having different outer widths. For example, a power-receiving-side coil part 210A illustrated in FIG. 4 may be used instead of the power-receiving-side coil part 210. The power-receiving-side coil part 210A illustrated in FIG. 4 is formed by changing the number of windings of a conductive wire N3 at different positions in the direction of the coil axis L, so that the outer width gradually decreases toward the bottom. For example, as illustrated in FIG. 5, the power-receiving-side coil part 210A has a first coil portion P1 and a second coil portion P2 arranged along the direction of the coil axis L. The first coil portion P1 and the second coil portion P2 are each a part of the power-receiving-side coil part 210A. The first coil portion P1 is positioned lower (toward the power-transmitting coil device 3) than the second coil portion P2. In this case, an outer width T11 of the first coil portion P1 in the left-right direction (width direction) is smaller than an outer width T12 of the second coil portion P2 in the left-right direction when viewed along the front-back direction perpendicular to the coil axis L (reference direction). Thus, even when the power-receiving-side coil part 210A formed by changing a winding diameter of the conductive wire N3 is used, the same effect is produced as that when the power-receiving-side coil part 210 of the first embodiment is used. Power-receiving-side coil parts of the other embodiments and variations described below may also employ the configuration of the power-receiving-side coil part 210A which has been described using FIGS. 4 and 5.

Second Embodiment

Figure 6:
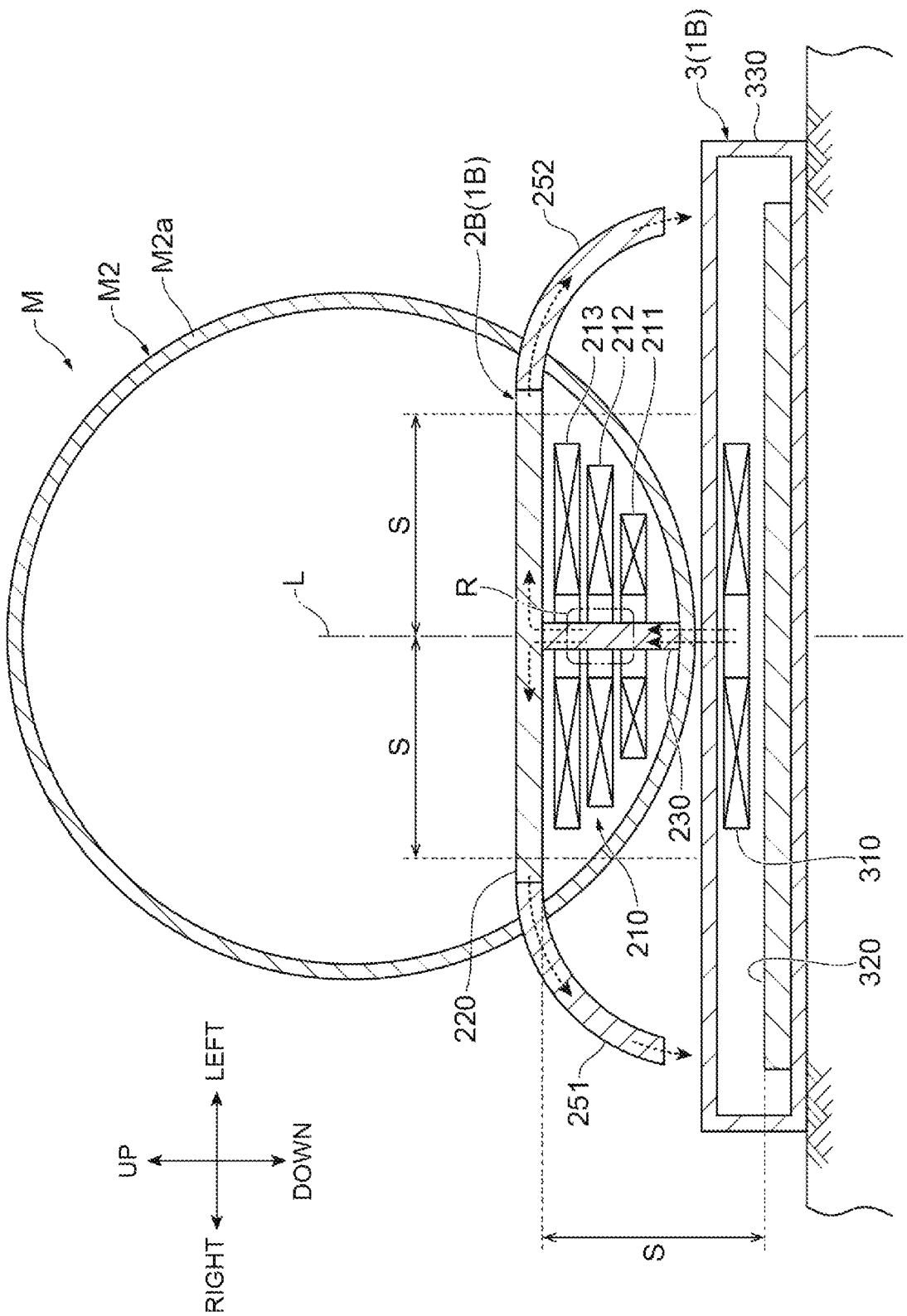
FIG. 6 is a cross-sectional view illustrating a schematic configuration of a wireless power supply system according to a second embodiment.

A second embodiment will be described. The second embodiment is a coil device according to the present disclosure applied to a power-receiving coil device of a wireless power supply system. As illustrated in FIG. 6, a wireless power supply system 1B according to this embodiment includes a power-receiving coil device (coil device, first coil device) 2B mounted in the underwater vehicle M, and the power-transmitting coil device 3 that is installed in a power supply location provided under water.

The power-receiving coil device 2B includes the power-receiving-side coil part 210, the power-receiving-side base magnetic body 220, the power-receiving-side core magnetic body 230, a projecting core (coupling magnetic body) 251, and a projecting core (coupling magnetic body) 252. The projecting cores 251 and 252 are made of a magnetic material such as an iron material, ferrite, or laminated steel.

One end of the projecting core 251 is coupled to a right end of the power-receiving-side base magnetic body 220. The other end of the projecting core 251 projects out of the exposed part housing M2a. That is, the projecting core 251 penetrates the exposed part housing M2a. Additionally, in the state in which power is received from the power-transmitting coil device 3, the projecting core 251 extends through the outside of the power-receiving-side coil part 210 toward the power-transmitting-side base magnetic body 320 such that the other end of the projecting core 251 faces the power-transmitting-side base magnetic body (counterpart base magnetic body) 320 of the power-transmitting coil device 3. The power-transmitting-side base magnetic body 320 illustrated in FIG. 6 has a size (outer shape in the horizontal direction) larger than the power-transmitting-side base magnetic body 320 illustrated in FIG. 2.

The interval between the power-receiving-side base magnetic body 220 and the power-transmitting-side base magnetic body 320 is a distance S. The projecting core 251 extends from the power-receiving-side base magnetic body 220 toward the power-transmitting-side base magnetic body 320 through a position separated from the coil axis L by the distance S in the left-right direction. Thus, the magnetic flux from the power-transmitting-side coil part 310 toward the power-receiving-side base magnetic body 220 passing through the core space R inside the power-receiving-side coil part 210 can be prevented from flowing from the power-transmitting-side coil part 310 toward the projecting core 251 without passing through the inside of the power-receiving-side coil part 210.

Similarly, one end of the projecting core 252 is coupled to a left end of the power-receiving-side base magnetic body 220. The other end of the projecting core 252 projects out of the exposed part housing M2a. That is, the projecting core 252 penetrates the exposed part housing M2a. Additionally, in the state in which power is received from the power-transmitting coil device 3, the projecting core 252 extends through the outside of the power-receiving-side coil part 210 toward the power-transmitting-side base magnetic body 320 such that the other end of the projecting core 252 faces the power-transmitting-side base magnetic body 320 of the power-transmitting coil device 3.

The projecting core 252 extends from the power-receiving-side base magnetic body 220 toward the power-transmitting-side base magnetic body 320 through a position separated from the coil axis L by the distance S in the left-right direction. Thus, the magnetic flux from the power-transmitting-side coil part 310 toward the power-receiving-side base magnetic body 220 passing through the core space R inside the power-receiving-side coil part 210 can be prevented from flowing from the power-transmitting-side coil part 310 toward the projecting core 252 without passing through the inside of the power-receiving-side coil part 210.

In this case, the power-receiving coil device 2B is capable of inducing, by the projecting cores 251 and 252, the magnetic flux from the power-receiving-side base magnetic body 220 toward the power-transmitting-side base magnetic body 320 through the outside of the power-receiving-side coil part 210. Consequently, the power-receiving coil device 2B is capable of appropriately inducing the magnetic flux passing through the outside of the power-receiving-side coil part 210, and further improving the power supply efficiency.

The other ends of the projecting cores 251 and 252 project out of the exposed part housing M2a. In this case, the power-receiving coil device 2B is capable of inducing the magnetic flux even on an outer portion of the exposed part housing M2a by the projecting cores 251 and 252. The power-receiving coil device 2B is thus capable of further improving the power supply efficiency.

Figure 7:
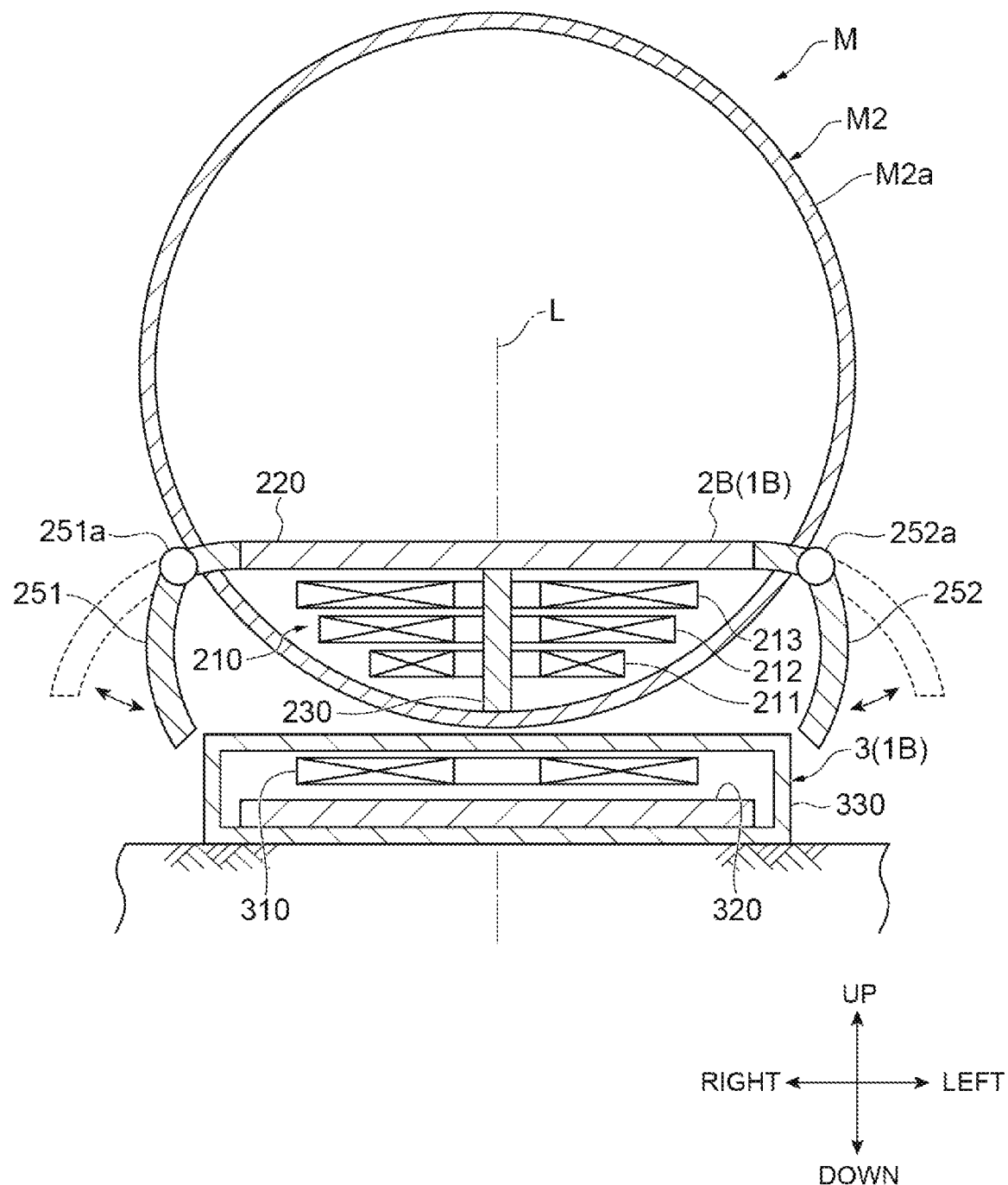
FIG. 7 is a cross-sectional view illustrating a schematic configuration of a wireless power supply system according to a variation.

As illustrated in FIG. 7, the power-receiving coil device 2B may further include a drive part 251a and a drive part 252a. The drive part 251a swings the projecting core 251 so as to change the position of the other end of the projecting core 251 (end facing the power-transmitting-side base magnetic body 320). Similarly, the drive part 252a swings the projecting core 252 so as to change the position of the other end of the projecting core 252 (end facing the power-transmitting-side base magnetic body 320).

In this case, by swinging the projecting cores 251 and 252 to match the shape (size) or the like of the power-transmitting-side base magnetic body 320 of the power-transmitting coil device 3 installed in the power supply location, the power-receiving coil device 2B enables power to be efficiently supplied between the power-receiving coil device 2B and a plurality of types of the power-transmitting coil devices 3 each having the power-transmitting-side base magnetic body 320 with a different shape or the like.

Additionally, in the projecting cores 251 and 252 illustrated in FIG. 6, the ends of the projecting cores 251 and 252 facing the power-transmitting-side base magnetic body 320 may be formed larger than the ends coupled to the power-receiving-side base magnetic body 220. That is, a surface facing the power-transmitting-side base magnetic body 320 of the end of the projecting core 251 facing the power-transmitting-side base magnetic body 320 may be formed larger than an end surface coupled to the power-receiving-side base magnetic body 220. Similarly, a surface of the projecting core 252 facing the power-transmitting-side base magnetic body 320 may also be formed large. In this case, even if the shapes (sizes) or the like of the power-transmitting-side base magnetic bodies 320 are different as illustrated in FIGS. 6 and 7, the projecting cores 251 and 252 are capable of appropriately forming a magnetic circuit with the power-transmitting-side base magnetic bodies 320 having different shapes or the like without swinging the projecting cores 251 and 252. The power-receiving coil device 2B thus enables power to be efficiently supplied between the power-receiving coil device 2B and a plurality of types of the power-transmitting coil devices 3 each having the power-transmitting-side base magnetic body 320 with a different shape or the like.

Furthermore, the projecting cores 251 and 252 are not limited to being projected in the left-right direction from the power-receiving-side base magnetic body 220. The projecting cores may project forward or backward from the power-receiving-side base magnetic body 220. The projecting cores may also project from the entire circumference of the edge of the power-receiving-side base magnetic body 220 so as to surround the entire circumference of the power-receiving-side coil part 210.

Third Embodiment

Figure 8:
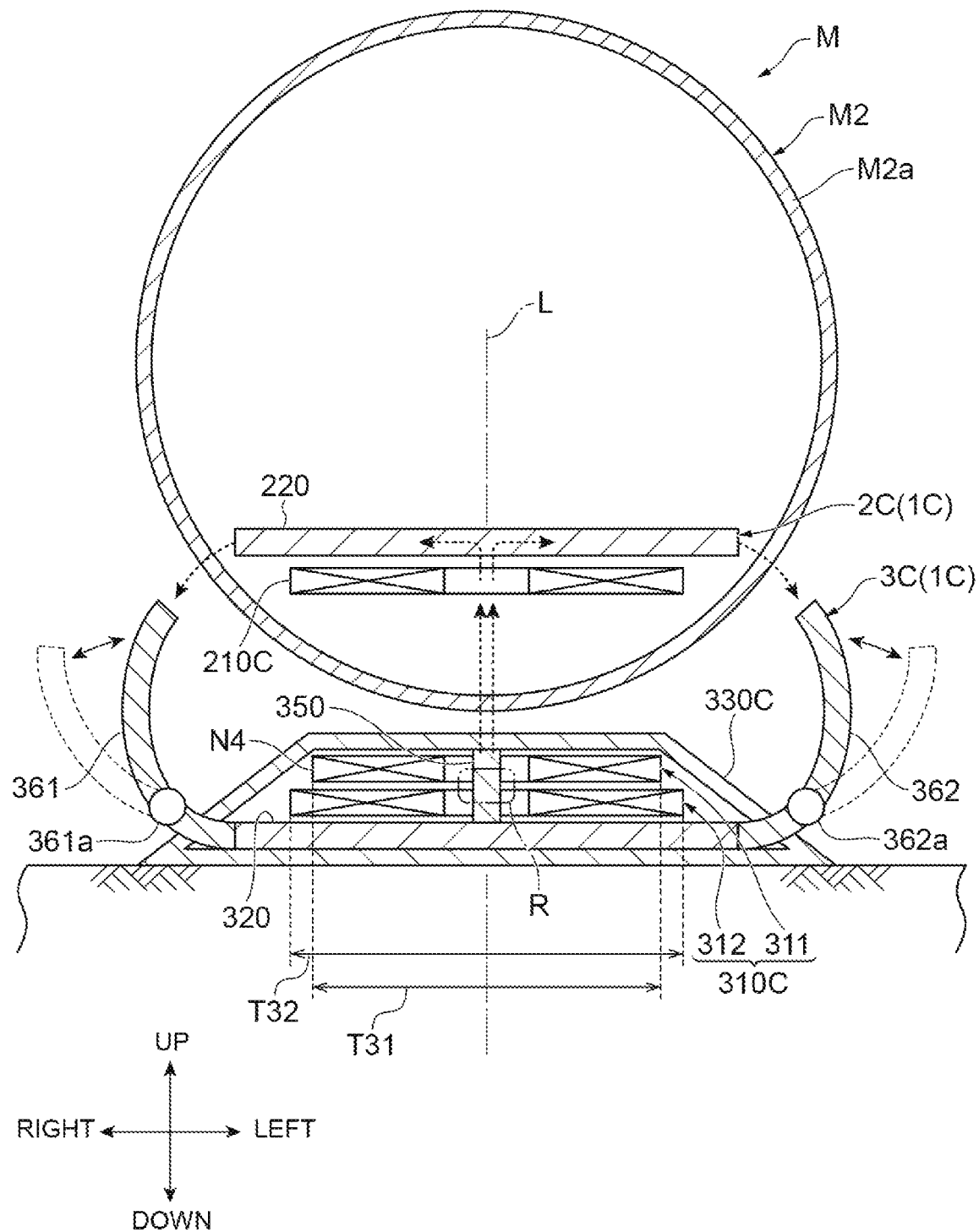
FIG. 8 is a cross-sectional view illustrating a schematic configuration of a wireless power supply system according to a third embodiment.

A third embodiment will be described. The third embodiment is a coil device according to the present disclosure applied to a power-transmitting coil device of a wireless power supply system. As illustrated in FIG. 8, a wireless power supply system 1C according to this embodiment includes a power-receiving coil (counterpart coil device) device 2C mounted in the underwater vehicle M, and a power-transmitting coil device (coil device) 3C that is installed in a power supply location provided under water.

The power-receiving coil device 2C is disposed in the lower part inside the exposed part housing M2a of the underwater vehicle M. The power-receiving coil device 2C includes a power-receiving-side coil part (counterpart coil part) 210C, and the power-receiving-side base magnetic body (counterpart base magnetic body) 220. The power-receiving-side coil part 210C is a coil having a configuration similar to that of the third power-receiving coil 213 of the first embodiment.

The power-transmitting coil device 3C includes a power-transmitting-side coil part (coil part) 310C, the power-transmitting-side base magnetic body (base magnetic body) 320, a power-transmitting-side housing (housing) 330C, and a power-transmitting-side core magnetic body (core magnetic body) 350.

The power-transmitting-side housing 330C contains the power-transmitting-side coil part 310C, the power-transmitting-side base magnetic body 320, and the power-transmitting-side core magnetic body 350. The power-transmitting-side housing 330C is made, for example, of a nonmagnetic material.

The power-transmitting-side coil part 310C has a conductive wire N4 wound around the core space R that extends along the coil axis L. More specifically, the power-transmitting-side coil part 310C includes a first power-transmitting coil (first coil, first coil portion) 311 and a second power-transmitting coil (second coil, second coil portion) 312. Each of the first power-transmitting coil 311 and the second power-transmitting coil 312 is formed in a substantially flat plate-like shape extending in the horizontal direction. The first power-transmitting coil 311 and the second power-transmitting coil 312 are arranged in this order from the top to the bottom. The first power-transmitting coil 311 is positioned more toward the power-receiving coil device 2C than the second power-transmitting coil 312 in a state in which power is transmitted to the power-receiving coil device 2C.

The power-transmitting-side coil part 310C is thus formed of the first power-transmitting coil 311 and the second power-transmitting coil 312 which are arranged along the direction of the coil axis L. The first power-transmitting coil 311 and the second power-transmitting coil 312 are connected in series with each other.

The configurations of the first power-transmitting coil 311 and the second power-transmitting coil 312 are respectively similar to the configurations of the first power-receiving coil 211 and the second power-receiving coil 212 of the first embodiment. The first power-transmitting coil 311 and the second power-transmitting coil 312 are arranged along the direction of the coil axis L such that the holes provided therein communicate along the direction of the coil axis L.

As illustrated in FIG. 8, an outer width T31 of the first power-transmitting coil 311 in the left-right direction (width direction) is smaller than an outer width T32 of the second power-transmitting coil 312 in the left-right direction when viewed along the front-back direction (reference direction) perpendicular to the coil axis L. The power-transmitting-side coil part 310C thus has an outer width that gradually decreases toward the top when viewed along the front-back direction.

A width of the power-transmitting-side housing 330C in the left-right direction gradually decreases toward the top when viewed along the front-back direction. That is, the power-transmitting-side housing 330C has different widths at different positions in the direction of the coil axis L when viewed along the front-back direction. Thus, the power-transmitting-side coil part 310C which has an outer width that gradually decreases toward the top is contained in the power-transmitting-side housing 330C which has a width that gradually decreases toward the top when viewed in the front-back direction.

That is, the width of a part of the power-transmitting-side housing 330C that encloses the first power-transmitting coil 311 in the left-right direction (width in the left-right direction) is smaller than the width of a part of the power-transmitting-side housing 330C that encloses the second power-transmitting coil 312 in the left-right direction (width in the left-right direction) when viewed along the front-back direction. The power-transmitting-side coil part 310C thus has a shape that conforms to the shape of the space inside the power-transmitting-side housing 330C that contains the power-transmitting-side coil part 310C when viewed along the front-back direction.

The power-transmitting-side base magnetic body 320 is a substantially plate-like member disposed inside the power-transmitting-side housing 330C so as to face a lower surface of the power-transmitting-side coil part 310C. The power-transmitting-side base magnetic body 320 is made, for example, of ferrite. That is, the power-transmitting-side base magnetic body 320 is disposed so as to face a surface of the power-transmitting-side coil part 310C (lower surface of the power-transmitting-side coil part 310C) opposite the surface facing the power-receiving-side coil part 210C (upper surface of the power-transmitting-side coil part 310C).

The power-transmitting-side core magnetic body 350 is a substantially pillar-like member that extends along the direction of the coil axis L. The power-transmitting-side core magnetic body 350 is disposed inside the hole (core space R) provided in the power-transmitting-side coil part 310C. The power-transmitting-side core magnetic body 350 is made, for example, of ferrite. A lower end of the power-transmitting-side core magnetic body 350 abuts an upper surface of the power-transmitting-side base magnetic body 320. An upper end of the power-transmitting-side core magnetic body 350 (end facing the power-receiving-side coil part 210C) projects out of the power-transmitting-side coil part 310C from a surface of the power-transmitting-side coil part 310C facing the power-receiving coil device 2C (upper surface of the first power-transmitting coil 311). The upper end of the power-transmitting-side core magnetic body 350 may also abut an inner surface of the power-transmitting-side housing 330C.

The power-transmitting coil device 3C may further include a projecting core (coupling magnetic body) 361 and a projecting core (coupling magnetic body) 362. The projecting cores 361 and 362 have configurations respectively similar to those of the projecting cores 251 and 252 of the second embodiment.

Specifically, one end of the projecting core 361 is coupled to a right end of the power-transmitting-side base magnetic body 320. The other end of the projecting core 361 projects out of the power-transmitting-side housing 330C. That is, the projecting core 361 penetrates the power-transmitting-side housing 330C. Additionally, in the state in which power is transmitted to the power-receiving coil device 2C, the projecting core 361 extends through the outside of the power-transmitting-side coil part 310C toward the power-receiving-side base magnetic body 220 such that the other end of the projecting core 361 faces the power-receiving-side base magnetic body 220 of the power-receiving coil device 2C.

Similarly, one end of the projecting core 362 is coupled to a left end of the power-transmitting-side base magnetic body 320. The other end of the projecting core 362 projects out of the power-transmitting-side housing 330C. That is, the projecting core 362 penetrates the power-transmitting-side housing 330C. Additionally, in the state in which power is transmitted to the power-receiving coil device 2C, the projecting core 362 extends through the outside of the power-transmitting-side coil part 310C toward the power-receiving-side base magnetic body 220 such that the other end of the projecting core 362 faces the power-receiving-side base magnetic body 220 of the power-receiving coil device 2C.

As described above, in the power-transmitting coil device 3C of the wireless power supply system 1C, the first power-transmitting coil 311 and the second power-transmitting coil 312 have different outer widths when viewed along the front-back direction. Thus, even if the power-transmitting-side housing 330C is shaped to have different widths at different positions in the direction of the coil axis L, the power-transmitting coil device 3C enables the power-transmitting-side coil part 310C to be disposed inside the power-transmitting-side housing 330C along the shape of the power-transmitting-side housing 330C which has a varying width. That is, the power-transmitting coil device 3C makes it possible to dispose the power-transmitting-side coil part 310C which has a larger shape in the direction of the coil axis L, and increase the magnetic flux that interlinks with the power-receiving-side coil part 210C when transmitting power. Additionally, the power-transmitting coil device 3C is capable of further increasing the magnetic flux through the power-transmitting-side coil part 310C when transmitting power due to the power-transmitting-side core magnetic body 350 disposed inside the power-transmitting-side coil part 310C, and appropriately inducing the magnetic flux toward the power-receiving coil device 2C. Consequently, the power-transmitting coil device 3C is capable of preventing being restricted by the shape of the power-transmitting-side housing 330C when disposing the power-transmitting-side coil part 310C, and improving the power supply efficiency.

In this embodiment, the width of the power-transmitting-side housing 330C in the left-right direction gradually decreases toward the top when viewed along the front-back direction. The distance between the coils during wireless power supply depends on the size of the coils (size in the direction perpendicular to the coil axis L). It is thus desired to use larger coils. Since coils generally have a flat plate-like shape, trying to dispose a larger coil inside the power-transmitting-side housing 330C which has a width that gradually decreases toward the top will result in a side of the coil abutting a side wall of the power-transmitting-side housing 330C, thereby preventing the coil from being disposed in a position closer to an upper wall of the power-transmitting-side housing 330C. That is, the interval between the flat plate-like coil and the upper wall of the power-transmitting-side housing 330C increases.

The power-transmitting-side coil part 310C of the power-transmitting coil device 3C thus has an outer width that gradually decreases toward the top. Consequently, even if the power-transmitting-side housing 330C is shaped to have a width that gradually decreases toward the top (toward the power-receiving coil device 2C) when viewed along the front-back direction, the power-transmitting coil device 3C enables the power-transmitting-side coil part 310C to be disposed inside the power-transmitting-side housing 330C in a position closer to the power-receiving coil device 2C. The interval between the power-transmitting-side coil part 310C and the power-receiving-side coil part 210C is accordingly reduced, so that a stronger coupling of the magnetic flux is formed between the power-transmitting-side coil part 310C and the power-receiving-side coil part 210C due to external leakage of the magnetic flux being suppressed. As a result, the power-transmitting coil device 3C is capable of further improving the power supply efficiency.

The power-transmitting-side coil part 310C is formed by arranging the first power-transmitting coil 311 and the second power-transmitting coil 312, which have different outer widths. In this case, the power-transmitting-side coil part 310C having different outer widths at different positions in the direction of the coil axis L when viewed along the front-back direction can be easily formed.

The upper end of the power-transmitting-side core magnetic body 350 projects above the upper surface of the power-transmitting-side coil part 310C. In this case, the power-transmitting-side core magnetic body 350 is capable of more appropriately inducing the magnetic flux from the power-transmitting-side coil part 310C toward the power-receiving-side coil part 210C, and further increasing the magnetic flux through the power-receiving-side coil part 210C. The power-transmitting coil device 3C is thus capable of further improving the power supply efficiency.

Additionally, the power-transmitting coil device 3C is capable of inducing, by the projecting cores 361 and 362, the magnetic flux from the power-receiving-side base magnetic body 220 of the power-receiving coil device 2C toward the power-transmitting-side base magnetic body 320 through the outside of the power-transmitting-side coil part 310C. Consequently, the power-transmitting coil device 3C is capable of appropriately inducing the magnetic flux passing through the outside of the power-transmitting-side coil part 310C, and further improving the power supply efficiency.

Furthermore, the other ends of the projecting cores 361 and 362 project out of the power-transmitting-side housing 330C. In this case, the power-transmitting coil device 3C is capable of inducing the magnetic flux even on an outer portion of the power-transmitting-side housing 330C by the projecting cores 361 and 362. The power-transmitting coil device 3C is thus capable of further improving the power supply efficiency.

The power-transmitting coil device 3C may further include a drive part 361a and a drive part 362a as illustrated in FIG. 8. The drive part 361a swings the projecting core 361 so as to change the position of the other end of the projecting core 361 (end facing the power-receiving-side base magnetic body 220). Similarly, the drive part 362a swings the projecting core 362 so as to change the position of the other end of the projecting core 362 (end facing the power-receiving-side base magnetic body 220).

In this case, by swinging the projecting cores 361 and 362 to match the shape (size) or the like of the power-receiving-side base magnetic body 220 of the power-receiving coil device 2C mounted in the underwater vehicle M, the power-transmitting coil device 3C enables power to be efficiently supplied between the power-transmitting coil device 3C and a plurality of types of the power-receiving coil devices 2C each having the power-receiving-side base magnetic body 220 with a different shape or the like.

Similarly to the projecting cores 251 and 252 described in the second embodiment, in the projecting cores 361 and 362 illustrated in FIG. 8, the ends of the projecting cores 361 and 362 facing the power-receiving-side base magnetic body 220 may be formed larger than the ends coupled to the power-transmitting-side base magnetic body 320.

The projecting cores 361 and 362 are not limited to being projected from the power-transmitting-side base magnetic body 320 in the left-right direction. The projecting cores may project forward or backward from the power-transmitting-side base magnetic body 320. The projecting cores may also project from the entire circumference of the edge of the power-transmitting-side base magnetic body 320 so as to surround the entire circumference of the power-transmitting-side coil part 310C.

Although the power-transmitting-side coil part 310C is formed of two coils having different outer widths (first power-transmitting coil 31 and second power-transmitting coil 312), the number of the coils is not limited to two. It is only required that the power-transmitting-side coil part 310C is formed of two or more coils having different outer widths. Additionally, the power-transmitting-side coil part 310C is not limited to being formed by arranging two or more coils having different outer widths. For example, similarly to the power-receiving-side coil part 210A illustrated in FIGS. 4 and 5, the power-transmitting-side coil part 310C may be formed by changing the number of windings of a conductive wire at various positions in the direction of the coil axis L so that the outer width gradually decreases toward the top.

The power-transmitting-side housing 330C need not have a width that gradually decreases toward the top when viewed along the front-back direction. In this case, the power-transmitting-side coil part 310C may be formed of a plurality of coils having different outer widths conforming to the shape of the power-transmitting-side housing 330C.

The wireless power supply system 1C according to the third embodiment may include the power-receiving coil device 2C described in the first embodiment instead of the power-receiving coil device 2C. In this case, the coils can be disposed closer to each other, so that the power supply efficiency may be further improved.

Fourth Embodiment

Figure 9:
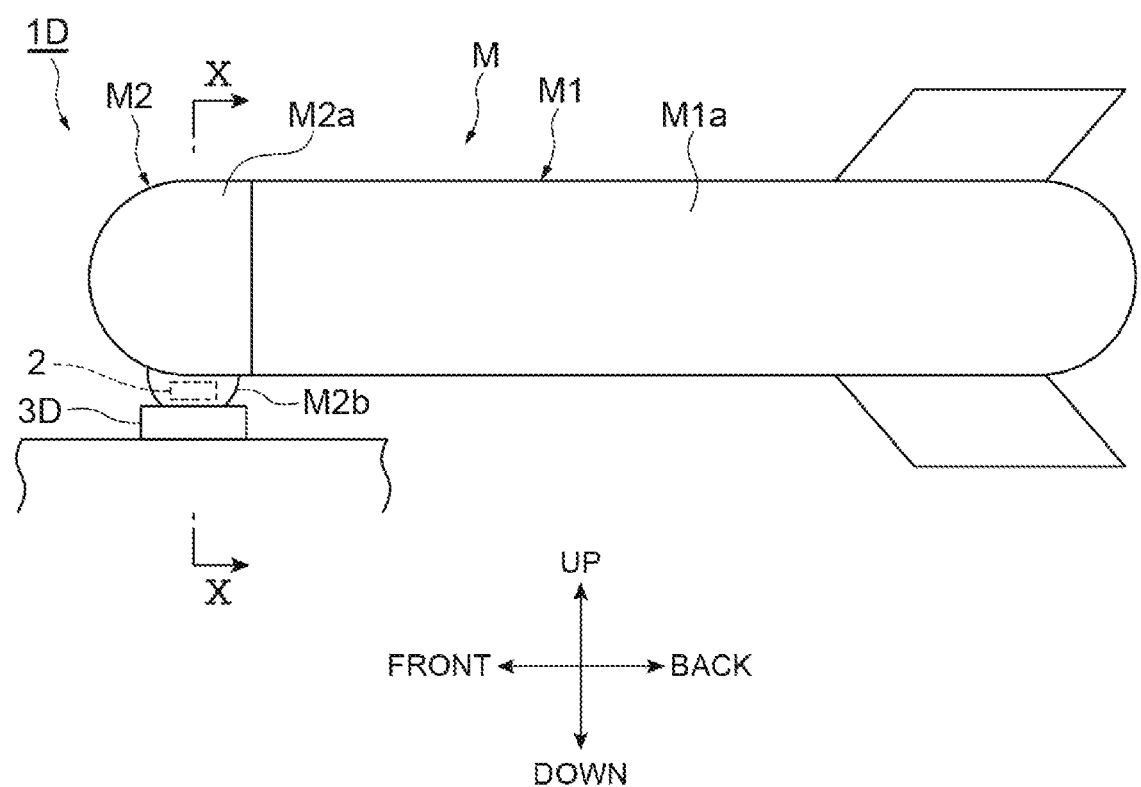
FIG. 9 is a schematic view of a wireless power supply system according to a fourth embodiment viewed from a lateral side of an underwater vehicle.
Figure 10:
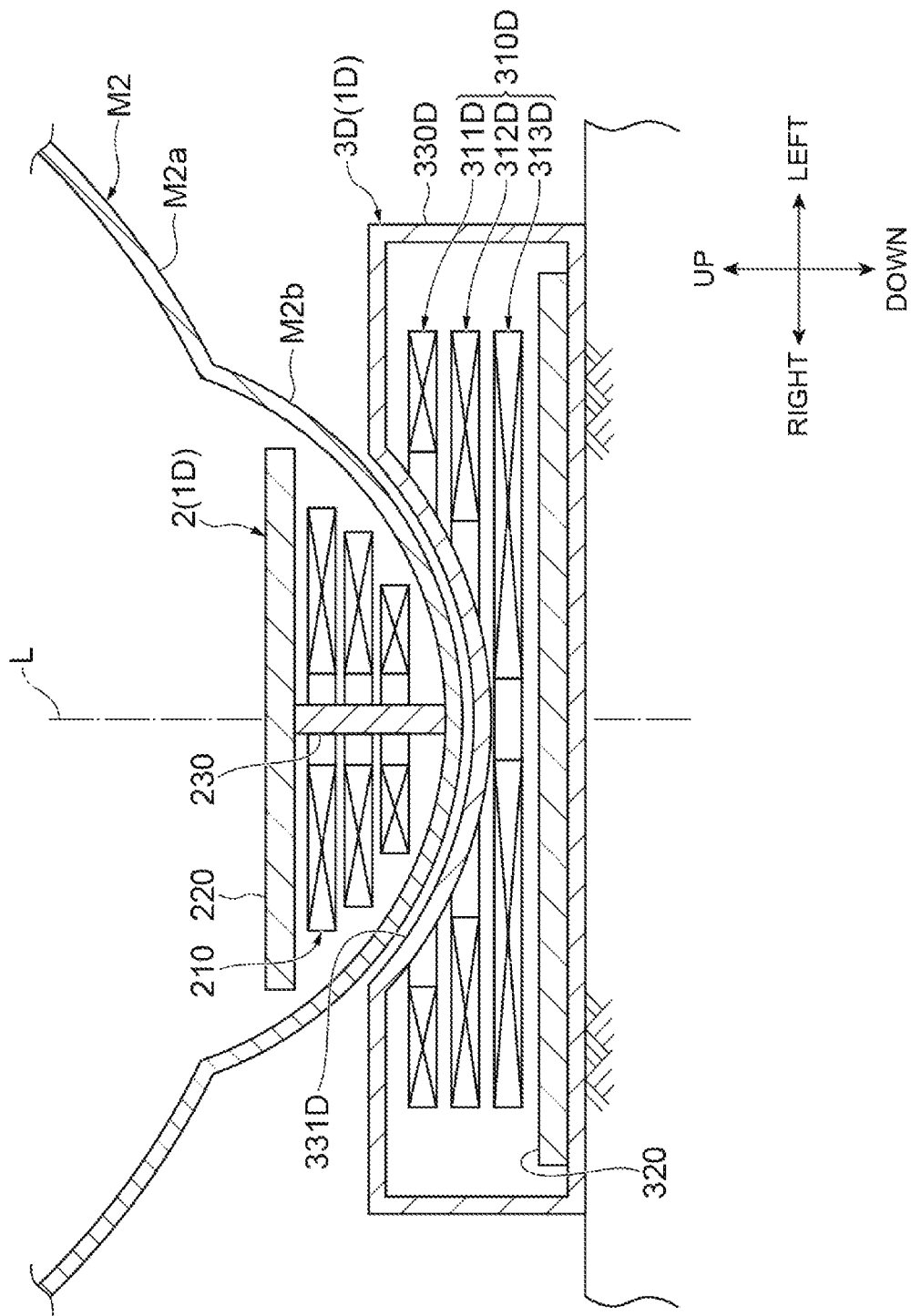
FIG. 10 is a cross-sectional view taken along line X-X of FIG. 9.

A fourth embodiment will be described. As illustrated in FIGS. 9 and 10, a wireless power supply system 1D according to this embodiment includes the power-receiving coil device (coil device, first coil device) 2 mounted in the underwater vehicle M, and a power-transmitting coil device (counterpart coil device, second coil device) 3D that is installed in a power supply location provided under water.

In this embodiment, the exposed part housing M2a of the underwater vehicle M has a coil containing part (housing) M2b. The coil containing part M2b projects downward in a substantially hemispherical shape, and contains the power-receiving coil device 2 therein. The coil containing part M2b is formed of a material other than metal such as resin (as one example, a nonmagnetic material) so as to enable wirelessly power supply.

The power-transmitting coil device 3D includes a power-transmitting-side coil part 310D, the power-transmitting-side base magnetic body 320, and a power-transmitting-side housing 330D. The power-transmitting-side coil part 310D includes a first power-transmitting coil 311D, a second power-transmitting coil 312D, and a third power-transmitting coil 313D. An inner diameter of the third power-transmitting coil 313D is smaller than an inner diameter of the second power-transmitting coil 312D. The inner diameter of the second power-transmitting coil 312D is smaller than an inner diameter of the first power-transmitting coil 311D. The first power-transmitting coil 311D to the third power-transmitting coil 313D are arranged in this order from the top to the bottom.

The power-transmitting-side coil part 310D is thus formed of the first power-transmitting coil 311D to the third power-transmitting coil 313D which are arranged along the direction of the coil axis L. Accordingly, the power-transmitting-side coil part 310D is shaped to have a recessed part in an upper surface.

The power-transmitting-side base magnetic body 320 is disposed so as to face a lower surface of the power-transmitting-side coil part 310D. The power-transmitting-side housing 330D contains the power-transmitting-side coil part 310D and the power-transmitting-side base magnetic body 320. The power-transmitting-side housing 330D is made, for example, of a nonmagnetic material. Additionally, a substantially hemispherical recessed part 331D is formed on an upper surface of the power-transmitting-side housing 330D so as to conform to the shape of the upper surface of the power-transmitting-side coil part 310D. The coil containing part M2b of the underwater vehicle M that contains the power-receiving coil device 2 can be fitted into the recessed part 331D on the upper surface of the power-transmitting-side housing 330D.

When wirelessly supplying power between the power-transmitting coil device 3D and the power-receiving coil device 2 in the wireless power supply system 1D, the coil containing part M2b of the underwater vehicle M is fit into the recessed part 331D of the power-transmitting-side housing 330D of the power-transmitting coil device 3D. The wireless power supply system 1D is thus capable of further improving the coupling coefficient of the magnetic flux between the power-transmitting-side coil part 310D of the power-transmitting coil device 3D and the power-receiving-side coil part 210 of the power-receiving coil device 2, and further improving the power supply efficiency.

The power-receiving coil device 2B described using FIGS. 6 and 7 in the second embodiment may be used instead of the power-receiving coil device 2 of the wireless power supply system 1D according to this embodiment. The power-transmitting coil device 3D of the wireless power supply system 1D according to this embodiment may also further include the projecting cores 361 and 362 as well as the drive parts 361a and 362a described using FIG. 8 in the third embodiment. In the case in which the wireless power supply system 1D further includes the projecting cores, etc., the wireless power supply system 1D is capable of further improving the power supply efficiency, similarly to the wireless power supply systems 1B and 1C described in the second embodiment and the third embodiment.

Although various embodiments and variations of the present disclosure have been described above, the present disclosure is not limited to the embodiments and variations above. For example, the coils forming the power-receiving-side coil part 210 of the power-receiving coil device 2, etc., are not limited to being formed in a flat plate-like shape, and may be curved along the shape of a bottom surface of the exposed part housing M2a, etc.

Although the power-receiving coil device 2, etc., are disposed in the lower part inside the exposed part housing M2a of the underwater vehicle M, they are not limited to being disposed in the lower part. For example, the power-receiving coil device 2, etc. may be disposed in an upper part or a side part inside the exposed part housing M2a depending on the direction from which power supply is received from the power-transmitting coil device 3. Even in this case, it is only required that the power-receiving coil device 2, etc., are disposed conforming to the shape of the place in which they are installed. That is, for example, in a case in which the power-receiving coil device 2 is disposed in the upper part inside the exposed part housing M2a, the power-receiving coil device 2 is disposed such that the side of the power-receiving-side coil part 210 with a smaller outer width (first power-receiving coil 211 side) is at the top.

Although power is transmitted from the power-transmitting coil device 3, etc., installed in the power supply location to the power-receiving coil device 2, etc., mounted in the underwater vehicle M in the embodiments above, power may be transmitted from a coil device mounted in the underwater vehicle M to a coil device that is installed externally. Additionally, the power-receiving coil device 2, etc., are not limited to being mounted in the underwater vehicle M that travels under water. The power-receiving coil device 2, etc., may be mounted in various movable objects other than the underwater vehicle M.

The embodiments and at least a part of the various variations described above may be arbitrarily combined.

REFERENCE SIGNS LIST 1, 1B, 1C, 1D Wireless power supply system
2, 2B Power-receiving coil device (coil device, first coil device)
3, 3D Power-transmitting coil device (counterpart coil device, second coil device)
2C Power-receiving coil device (counterpart coil device)
3C Power-transmitting coil device (coil device)
210 Power-receiving-side coil part (coil part, first coil part)
210C Power-receiving-side coil part (counterpart coil part)
211 First power-receiving coil (first coil, first coil portion)
212 Second power-receiving coil (second coil, second coil portion)
220 Power-receiving-side base magnetic body (base magnetic body, counterpart base magnetic body)
230 Power-receiving-side core magnetic body (core magnetic body)
240 Coupling magnetic body
251, 252, 361, 362 Projecting core (coupling magnetic body)
251a, 252a, 361a, 362a Drive part
310, 310D Power-transmitting-side coil part (counterpart coil part, second coil part)
310C Power-transmitting-side coil part (coil part)
311 First power-transmitting coil (first coil, first coil portion)
312 Second power-transmitting coil (second coil, second coil portion)
320 Power-transmitting-side base magnetic body (base magnetic body, counterpart base magnetic body)
330C Power-transmitting-side housing (housing)
350 Power-transmitting-side core magnetic body (core magnetic body)
L Coil axis
M Underwater vehicle (movable object)
M2a Exposed part housing (housing)
M2b Coil containing part (housing)
N1 to N4 Conductive wire
P1 First coil portion
P2 Second coil portion
R Core space

The invention claimed is:

1. A coil device installed inside a housing and configured to transmit or receive power to or from a counterpart coil device installed outside the housing, the coil device comprising:
a coil part having a conductive wire wound around a core space extending along a coil axis, the coil part being configured to transmit or receive power to or from a counterpart coil part of the counterpart coil device; and a core magnetic body disposed inside the core space, wherein the coil axis extends along a direction in which the coil part and the counterpart coil part face one another when power is being transmitted or received, wherein the coil part has a first coil portion and a second coil portion arranged along a direction of the coil axis, wherein, when viewed along a predetermined reference direction perpendicular to the coil axis, an outer width of the first coil portion in a width direction perpendicular to the direction of the coil axis and the reference direction is smaller than an outer width of the second coil portion in the width direction, a base magnetic body disposed to face a surface of the coil part opposite a surface facing the counterpart coil part; and a coupling magnetic body having one end coupled to the base magnetic body, wherein the coupling magnetic body extends through the outside of the coil part toward a counterpart base magnetic body provided in the counterpart coil device such that another end of the coupling magnetic body faces the counterpart base magnetic body in the state in which power is transmitted or received.

2. The coil device according to claim 1, wherein the other end of the coupling magnetic body projects out of the housing.

3. The coil device according to claim 2, further comprising a drive part configured to change a position of the other end of the coupling magnetic body by swinging the coupling magnetic body.

4. The coil device according to claim 1, wherein the coil device is mounted in a movable object, and the coupling magnetic body is formed of a structure provided in the movable object and made of a magnetic material.

5. The coil device according to claim 1, wherein, when an interval between the base magnetic body and the counterpart base magnetic body is a distance S, the coupling magnetic body extends from the base magnetic body toward the counterpart base magnetic body through a position separated from the coil axis by the distance S.

* * * * *